(No Model.)

R. MARSH.
FAUCET.

No. 350,596. Patented Oct. 12, 1886.

Witnesses
Wm. A. Lowe
Jas. L. Whiting

Inventor
Riverius Marsh.
By his Attorney S. T. McDougall.

UNITED STATES PATENT OFFICE.

RIVERIUS MARSH, OF NEW BRUNSWICK, NEW JERSEY.

FAUCET.

SPECIFICATION forming part of Letters Patent No. 350,596, dated October 12, 1886.

Application filed February 11, 1886. Serial No. 191,555. (No model.)

*To all whom it may concern:*

Be it known that I, RIVERIUS MARSH, a citizen of the United States, residing at New Brunswick, in the county of Middlesex and State of New Jersey, have invented a new and useful Improvement in Faucets, of which the following is a full, clear, and exact description, reference being had to the accompanying drawings, and to the letters of reference marked thereon, and forming a part of this specification.

My invention relates to improvements in faucets to be applied to oil-cans, lamp-fillers, tanks, and other vessels.

The object of my invention is to provide a cheap and durable device for filling lamps, cans, and other vessels, and for drawing oil or other fluids from vessels.

Figure 1:
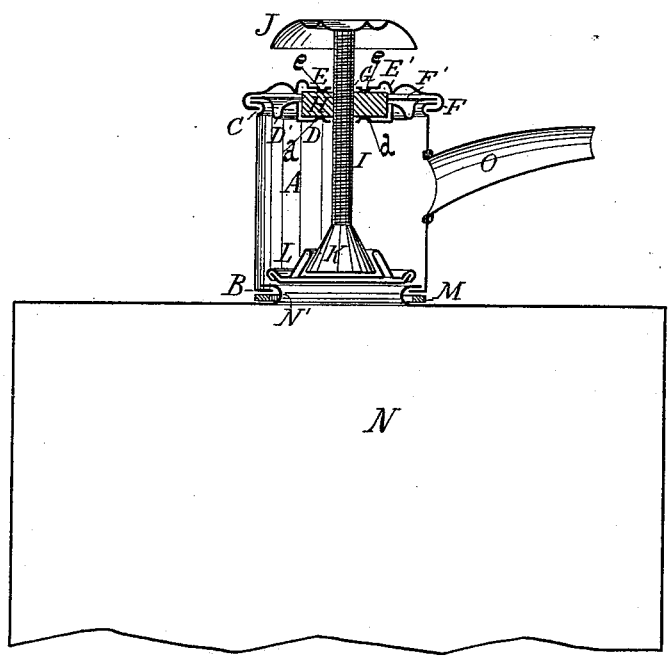
Figure 2:
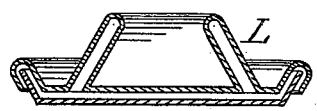

Figure 1 is a central vertical section of my invention, showing the interior construction. Fig. 2 is a view in section of the valve.

A, Fig. 1, represents the shell or body of the faucet, which I preferably make of spun or drawn metal. At the bottom it has an inward-turning flange, as shown at B. At the top it is drawn in slightly and circles outward a short distance, as shown at C, the object being described hereinafter.

D is a shell placed on the top of the body A. This shell is made of spun or drawn metal, and is made square at the center to receive a nut. It extends up a short distance, thence outward, thence downward, thence upward again, and circles outward to the edge of the body A and forms a bead, D'.

E is a cap-shell which covers the shell D and the top of the body A. It is spun or drawn up, and is flat near the center where it covers the nut, the lower surface being slightly grooved or corrugated. It then rises up a short distance and down again, forming a bead, E', thence circling outward and downward and under the edge of the shell D and top edge of the body A, as shown at F. The three edges are crimped or seamed together, forming a tight joint and holding the nut in position, also forming an air-chamber, F', between the shells D and F, the object of the air-chamber being described hereinafter. The shells D and E are ribbed where they come in contact with the upper and lower side of the nut near the screw-rod, by which means air passes to and from the air-chamber F', as shown at G.

d are ribs on shell D, and e similar ribs on shell E.

H is a nut held in position by the shells D and E.

I is a valve screw-rod, made of iron or other suitable metal. It has a thumb-piece, J, on the upper end and an enlarged tapering head, K, on the lower end, which revolves inside the tapering projections on the upper side of the valve when the screw-rod I is turned.

L is a valve composed of two shells, or a shell and washer or packing. The upper or top part of the valve-shell is spun up out of one piece of metal. It has an upward-rising tapering ring corresponding in shape to the head K, inside of which the head revolves, as shown. The center of the shell below the head is closed, and it extends a short distance outside the tapering ring and rises up at the outer edge, and is turned over and down, forming nearly a half-circle. The lower shell, washer, or packing is made flat in the center, and with an upward-rising flange at the outward edge, said flange fitting into the half-circle on the upper shell, and is crimped or swaged to it, making a firm and durable valve.

M is a packing placed under the inward-turning flange at the bottom of the body A.

N is an oil-can or other vessel having an upward-rising tube or flange, N', which is turned over on the inward flange B on the bottom of the body A, and is firmly pressed or turned down on it, making a tight joint, and also forming a valve-seat.

O is a spout or nozzle, made of metal and secured in the usual manner.

I do not confine myself to the exact form of the shell composing the air-chamber, as other forms may be used. The object of the air-chamber is to prevent the oil spurting out at the vent when the can is quickly turned to or over on one side and the valve opened, (which is an objection to other forms of vents) the oil spurts into the air-chamber and returns again into the faucet, allowing the air to freely pass into the faucet and can.

My invention has other advantages. The shells D and F, forming an air-chamber and encircling the nut H and holding it in position, also seal the top edge of the body A.

The faucet being made without solder, it lessens the cost of making one half and makes a more desirable article.

A screw with a turning flange may be used in place of the rising tube or flange N', and it may be screwed on an ordinary oil-can having a corresponding screw, or it may be soldered to a flat-top or other can, as desired.

Having fully described my invention, what I desire to claim and secure by Letters Patent is—

1. In a faucet, the body A, having spout O, inward flange B at the bottom and circling flange C at the top, shell D, shell E, nut H, valve-rod I, and valve L, substantially as described.

2. In a faucet, the shells D and E, air-chamber F', nut H, vent G, valve-rod I, and valve L, in combination with the body A, spout O, flange B, packing M, and valve-seat N', substantially as shown and described.

3. In a faucet, the combination of the following parts: the body A, having spout O, inward flange B at the bottom and circling flange C at the top, shells D and E, air-chamber F', nut H, vent G, valve screw-rod I, having thumb-piece J on one end and head K on the other end, valve L, packing M, and flange and valve-seat N', all constructed and arranged substantially as shown and described.

RIVERIUS MARSH.

Witnesses:
EDWARD HINE,
PETER WEISSE.